UNITED STATES PATENT OFFICE.

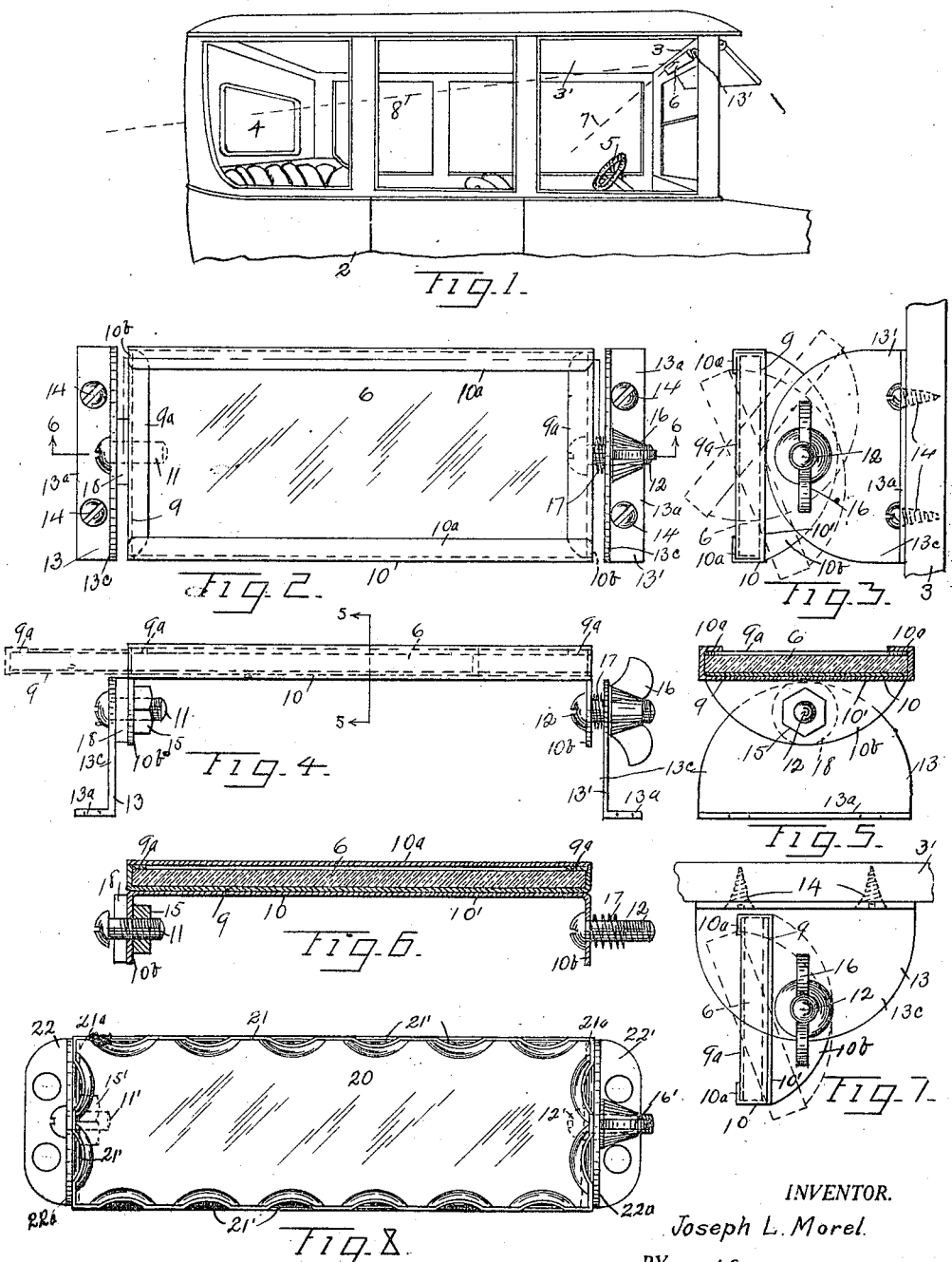

JOSEPH L. MOREL, OF FAYETTEVILLE, NEW YORK.

MIRROR FOR CLOSED AUTOMOBILES.

1,322,717.      Specification of Letters Patent.      Patented Nov. 25, 1919.

Application filed April 21, 1919. Serial No. 291,710.

*To all whom it may concern:*

Be it known that I, JOSEPH L. MOREL, a citizen of the United States, residing at Fayetteville, in the county of Onondaga and State of New York, have invented certain new and useful Improvements in Mirrors for Closed Automobiles, of which the following is a specification.

This invention relates to improvements in mirrors, designed particularly for use in closed automobiles, and has for its object to provide a novel and simple device of the class, which may be adjustably mounted upon the inner front wall, or suspended from the ceiling of the body of the car, the mirror being pivotally supported, so as to permit it to be tilted and set at any desired angle, for enabling the driver to see therein the reflections of objects approaching, or located at, the rear of the car. A further object is to provide novel tension means for holding the mirror in various adjusted positions as well as means for locking and holding the mirror rigidly in such positions. And a further object is to provide novel and simple means for removing and replacing the mirrors when they become broken or worn out.

I attain these objects by the means set forth in the detailed description which follows, and as illustrated by the accompanying drawing, in which—

Figure 1 is a broken perspective view of a closed automobile, to which my improvement is applied. Fig. 2 is an enlarged face view of the mirror and its supporting brackets; showing the tension and locking means. Fig. 3 is an end elevation of the same, in which the full and dotted lines show the adjustable nature of the device. Fig. 4 is an edge view of the mirror; the dotted lines to the left showing the manner of removing and replacing the mirror. Fig. 5 is a vertical cross-section, taken on line 5—5 of Fig. 4. Fig. 6 is a central longitudinal section, taken on line 6—6 of Fig. 2, the brackets being omitted. Fig. 7 is an end elevation; showing the mirror suspended from the roof of the car. Fig. 8 is a face view; showing an ornamental glass, and a slightly modified support for the glass.

In the drawing, 2 represents the body of a limousine, or other closed automobile; 3 is the inner side of the front wall; 4 is the rear window, and 5 is the steering-wheel, near which the driver sits.

6 represents generally my improved mirror, which is shown mounted on the front wall 3 and faces rearwardly. In Fig. 1 the broken line 7 indicates the range of the driver's vision when peering into the mirror 6; while the broken line 8, which extends from the mirror through the rear window 4, indicates the line upon which the reflections of objects behind the car reach the mirror. The mirror 6 is preferably oblong, and is supported by a sheet metal holder 9, which is substantially the same breadth as the glass 6. The sheet metal 9 is long enough to be folded around and to grip the corresponding ends of the glass, the opposite ends of the metal comprising similar end flaps $9^a$, which engage the face of the glass. The glass 6 and its holder 9 are slidably disposed in an open-face and open-end frame 10, which is substantially the same length as the holder 9. The frame 10 is preferably made of sheet metal, and consists of a back portion $10'$, whose opposite lateral edges are bent upwardly and inwardly to provide longitudinal flaps $10^a$, which overlap the opposite edges of the mirror and frictionally engage the end flaps $9^a$, for holding the mirror in place. In case the glass 6 breaks or becomes impaired as a mirror, the holder 9 and the glass may be readily and quickly removed from the frame 10, and a new glass installed, by simply sliding the holder endwise, as shown by the dotted lines at the left in Fig. 4. The ends of the back $10'$ of the frame are bent at right angles to provide lugs $10^b$, the said lugs being correspondingly perforated to receive pivot bolts $11$ and $12$. $13$ and $13'$ are similar L-shaped brackets, each having a foot portion $13^a$, which is perforated to receive screws 14, by means of which the brackets are secured to the body of the car. The relatively large lugs $13^c$ of the brackets are also perforated to receive the bolts 11 and 12. The bolt 11 is held in place by a nut 15; while the bolt 12 is held in place by a thumb-nut 16. In the preferred form of the device, the mirror and its frame 10 are held in the various adjusted positions, shown in Figs. 3 and 7, by means of simple tension devices, as for example, a coil spring 17, which is supported by the bolt 12, and is disposed between the lug $13^c$ of the bracket $13'$ and the adjacent lug $10^b$ of the frame, and also a washer 18, preferably of soft rubber (shown in elevation in Figs. 2 and 4), and disposed between the bracket 13 and the frame 10. Either of the tension devices 17 or 18 may be used alone, but I prefer to use the two, as shown, in order to produce the requisite tension to withstand the vibrations of the car, by the use of relatively small and light parts. The tension of the parts 17 and 18 may be increased by the tightening up of the thumb-nut 16, and when screwed up tight, said nut tends to rigidly lock the mirror in place. Figs. 3 and 7 show the mirror attached respectively to the front wall 3, and to the roof 3', of the car.

Fig. 8 shows an ornamental mirrow 20, whose edges are scalloped, the said mirrow being mounted in a frame 21, whose lateral and end edges 21' are bent inwardly and clenched at each of the scallops, for rigidly holding the glass in place. The mirror 20 is pivoted between brackets 22 and 22', by bolts 11' and 12', the former being in place by a nut 15'; while the latter is held in place by a thumb-nut 16'. The mirror 20 is held in the various adjusted positions (not shown), by the tightening of the thumb-nut 16'. The back of the frame 21 is provided with end lugs 21$^a$, similar to the lugs 10$^b$, and these, as well as, the lugs 22$^a$ of the brackets 22 are pierced by the bolts 11' and 12'.

My mirror is extremely simple, and whether it is mounted on the front wall 3, or suspended from the roof 3' of the body 2, the mirror may be readily and quickly adjusted, for enabling the driver of the car to obtain a clear view through the rear window 4, without requiring him to shift his body, or otherwise interfering with his operation of the car. The provision of the tension means dispenses with the manipulation of the thumb-nut 16, thus permitting the adjustment of the mirror without waste of time.

Having thus described my invention, what I claim, is—

1. A device of the class described, including a pair of brackets, a frame having open ends and an open face, a mirror, a holder for protecting the mirror from contact with said frame, said holder slidable longitudinally in said frame, and pivot-bolts for adjustably securing said frame to said brackets.

2. A device of the class described, including a pair of brackets, a frame having open ends and an open face, a mirror, a holder for said mirror, said holder slidable longitudinally in said frame, bolts for adjustably securing said frame to said brackets, and means for locking said frame in various adjusted positions.

3. In a device of the class described, a pair of L-shaped brackets, a frame, said frame having open ends and an open side and having perforated lugs between the brackets, a mirror, a holder having end flaps which grip the ends of the mirror, said holder slidable in said frame, means for pivotally connecting the lugs of said frame to said brackets, and tension devices interposed between the lugs of said frame and said brackets for holding said mirror in different positions when rotated on said pivot means.

4. A mirror, a holder for said mirror, the ends of the holder overlapping the ends of the mirror, a frame having open ends for slidably receiving said holder, said frame having an open side and marginal flaps which frictionally engage and retain the holder in place, brackets pivotally connected to the opposite ends of said frame, and tension means disposed at the opposite ends of the frame for holding the mirror when adjusted.

5. In a mirror for closed automobiles, an oblong mirror, a holder for said mirror, an oblong frame having open ends for slidably supporting said holder and mirror, one side of said frame being open and provided with longitudinal flaps which overlap the corresponding edges of the mirror and frictionally engage the opposite ends of said holder, the opposite ends of said frame provided with angular perforated lugs, a pair of brackets, and means for pivotally connecting said lugs to said brackets.

In testimony whereof I affix my signature.

JOSEPH L. MOREL.